April 25, 1967 W. B. STUHLER ET AL 3,315,768
HYDRAULIC SHAFT POSITIONING MECHANISM
Filed Nov. 22, 1965

INVENTORS
William B. Stuhler
Raymond A. Zandonatti
BY
Attorneys

United States Patent Office

3,315,768
Patented Apr. 25, 1967

3,315,768
HYDRAULIC SHAFT POSITIONING MECHANISM
William B. Stuhler, Garland, and Raymond A. Zandonatti, Dallas, Tex., assignors to Collins Radio Company, Cedar Rapids, Iowa, a corporation of Iowa
Filed Nov. 22, 1965, Ser. No. 509,103
14 Claims. (Cl. 188—67)

This invention relates generally to a hydraulic device for positively positioning a shaft and particularly to a hydraulic device which positively positions a shaft and also limits the velocity of longitudinal movement of the shaft.

There exists in the art several types of hydraulic systems which are useful in positioning a longitudinally movable shaft. Examples of some well-known devices are standpipe reservoir and diaphragm reservoirs. The first type of these devices has the disadvantage of being subject to fluid leakage and undesirable entrance of air into the system. The second type suffer back pressures which cause the system to creep. Both types of systems are also disadvantageous because they are complex and frequently require external plumbing, valves and the like. For these reasons there has long existed in the art the need for a system which is self-contained while at the same time being free of fluid leakage and which is operational in both directions to control the speed of movement of a shaft and also to lock the shaft at any desired position.

Hydraulic devices of the type contemplated by this invention are useful in limiting the velocity and controlling the position of heavy mechanical devices. Examples of areas where utility is readily found are heavy drawers containing electronic equipment, lifts, and other areas where the velocity of motion must be controlled and a fixed position maintained.

It is therefore an object of this invention to provide a hydraulic device which has no external fluid supply or storage area and which is not subject to leakage of fluid either into or out of the device.

It is another object to provide such a device which positively controls the position of a longitudinally movable shaft, and which is free of creep after the desired position of the shaft is obtained.

It is another object of this invention to provide such a device which limits the speed of movement of a shaft as the shaft moves longitudinally in either of two directions.

It is another object to provide such a device which is free from external plumbing and valves and which contains a single external valve control.

Further objects, features, and advantages of the invention will become apparent from the following description and claims when read in view of the accompanying drawings wherein like numbers indicate like parts and in which:

The above objects are realized by a device which contains four chambers. Three of the four chambers are filled with a noncompressible fluid while the fourth is opened to the atmosphere. The dimensions of the three fluid containing chambers are chosen such that a change of volume of one chamber is exactly equal to the combined change of volume of the other two cylinders. The total volume which contains fluid therefore remains constant for all positions of the movable element and consequently no outside fluid source or storage means is required.

Figure 1:
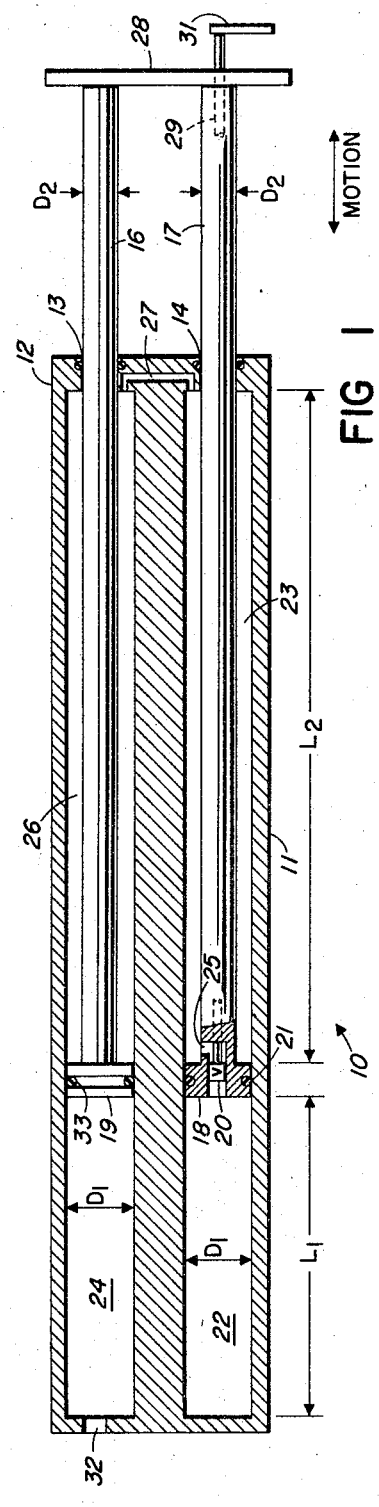
FIGURE 1 shows a first embodiment of the invention where two similar cylinders are mounted in a parallel relationship.

Referring now to FIGURE 1 which shows a hydraulic device 10 which is used to position a drawer 28, or some similar device. The device comprises two right hollow cylinders 11 and 12 arranged with their longitudinal axes in a parallel relationship. Cylinder 12 contains a hole or aperture 13 through which a shaft 16 is inserted. The shaft 16 is concentrically contained in cylinder 12. Cylinder 11 contains an aperture 14 through which a shaft 17 is inserted in a similar manner. Pistons 18 and 19 are fixedly attached to shafts 17 and 16 respectively. O rings 21 and 33 prevent leakage along the sides of pistons 19 and 18 respectively. Apertures 13 and 14 also contain O rings to prevent fluid leakage along shafts 16 and 17. The arrangement as shown provides four fluid chambers 22, 23, 24, and 26. Chambers 23 and 26 are connected by a communication 27 such that fluid can freely flow back and forth between the two chambers. Chamber 24 is provided with an aperture 32 which allows air from the atmosphere to freely enter and leave the chamber. Chamber 22 is filled with a substantially noncompressible fluid of any type commonly known in the art. Situated in shaft 17 and piston 18 is an aperture 25 containing a valve 20. An actuating rod 29 passes through shaft 17 to an external valve operating handle 31. By applying torque to actuating handle 31 valve 20 can be opened and closed to allow passage of fluid between chambers 22 and 23. Chambers 22, 23, and 26 are designed such that a change of volume of chamber 22 is exactly equalled by the combined change of volume of chambers 23 and 26. Because this relationship exists between the volumes of chambers 22, 23, and 26, a change of position of pistons 18 and 19 will merely result in the displacement of fluid through valve 20 but will not require the addition of any fluid from an external source. For this reason the device is originally filled with a substantially noncompressible fluid so that chambers 22, 23, and 26 are filled with fluid. Chamber 24 contains no fluid and is open to the atmosphere. The movement of shafts 16 and 17 in a longitudinal direction (for example, to the left in FIG. 1) will result in a decrease of volume of chamber 22 and an increase in the volume of chambers 23 and 26. The decrease of volume of chamber 22 is exactly offset by an increase of volume of chambers 23 and 26 and therefore a positive positioning of platform 28 is assured and no external fluid source or fluid storage system is required. Because the fluid is noncompressible the shaft position will remain unchanged so long as valve 20 is closed to thereby prevent a fluid flow between chambers 22 and 23. By using cylinders 11 and 12 with an identical diameter, and also by selecting shafts 16 and 17 with identical diameters, the relationship of the diameters is easily figured in a manner which assures that the change of volume of chamber 22 is exactly offset by the combined change of volume of chambers 23 and 26. The operation of the device does not require the diameters of cylinders 11 and 12 and shafts 16 and 17 to be identical. However, it is preferable as it results in ease of manufacture and interchangeability of parts.

Using equal cylinders and shafts as shown by diameters $D_1$ and $D_2$ in FIG. 1 and realizing that a change of $L_1$ results in an equal but opposite change in $L_2$ the following equations show the relationship between $D_1$ and $D_2$ which results in the desired volumetric relationship:

$$\Delta V_{22} = \Delta V_{23} + \Delta V_{26} \qquad \text{(Equation 1)}$$

$$\frac{\pi D_1^2 \Delta L_1}{4} = \frac{\pi D_1^2 \Delta L_2 - \pi D_2^2 \Delta L_2 + \pi D_1^2 \Delta L_2 - \pi D_2^2 \Delta L_2}{4}$$

but $\Delta L_1 = \Delta L_2$ ∴ after multiplying both sides of the equation by 4

$$D_1^2 = D_1^2 - D_2^2 + D_1^2 - D_2^2$$
$$D_1^2 = 2D_1^2 - 2D_2^2$$
$$D_1^2 = 2D_2^2$$
$$D_1 = \sqrt{2D_2} \qquad \text{(Equation 2)}$$

It is now evident that the desired volumetric relationship of chambers 22, 23, and 26 can be achieved without regard to the length of cylinders 11 and 12. An arbitrary choice can be made of either $D_1$ or $D_2$ and the diameter required for the other can be calculated by referring to the relationship shown in Equation 2.

Figure 2:
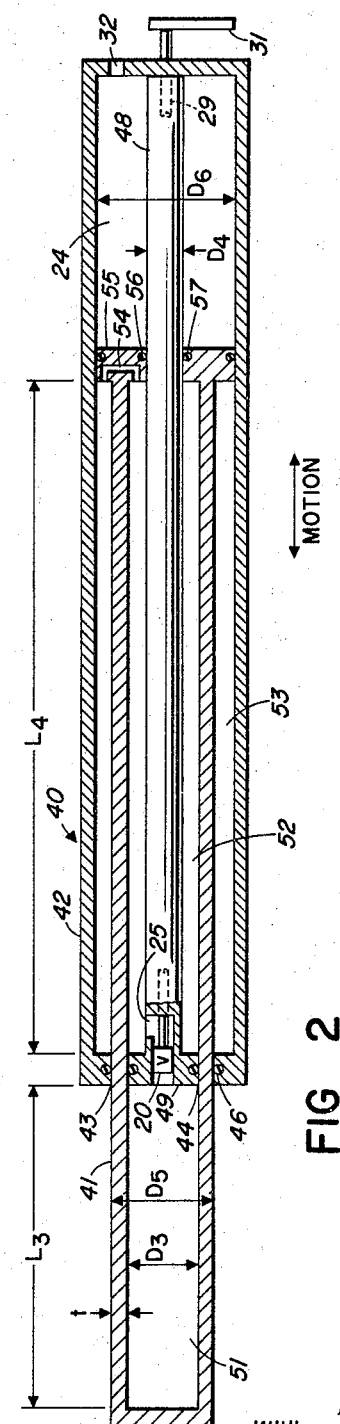
FIGURE 2 shows a second embodiment of the invention in which two cylinders are mounted in a concentric relationship.

Referring now to FIGURE 2 which shows a second embodiment of the initial invention. In this embodiment two right cylinders 41 and 42 are arranged in a concentric relationship. Chambers 51, 52 and 53 are filled with a substantially noncompressible fluid while chamber 24 communicates with the atmosphere via aperture 32. Chamber 32 communicates with chamber 51 through aperture 25 via valve 20 in piston 49 and shaft 48. Chamber 52 communicates with chamber 53 via aperture 54 in piston 55. "O" rings 44, 46, 56, and 57 are provided at suitable locations to prevent leakage of fluid into and out of the system.

Extending through shaft 48 is an actuating rod 29. Rod 29 is connected to handle 31 and valve 20 so that the valve can be opened and closed externally of the system. Cylinder 42 is free to slide along cylinder 41 so long as valve 49 is open to permit fluid to flow between the chambers 51 and 52. However, when the valve is closed fluid in chamber 51 prevents movement of cylinder 42 to the left and fluid in chambers 52 and 53 prevents movement of cylinder 42 to the right.

The significant diameters in achieving the desired volumetric relationship are identified $D_3$, $D_4$, $D_5$, and $D_6$ in FIGURE 2. As shown below by arbitrarily choosing any three of these diameters the fourth can be easily calculated. The important consideration is that a change of volume of chamber 51 is equal to the combined change of volume of chambers 52 and 53.

$$\Delta V_{51} = \Delta V_{52} + \Delta V_{53} \qquad \text{(Equation 3)}$$

$$\pi D_3^2 \Delta L_3 = \frac{\pi D_3^2 \Delta L_4 - \pi D_4^2 \Delta L_4 + \pi D_6^2 \Delta L_4 - \pi D_5^2 \Delta L_4}{4}$$

but $\Delta L_3 = \Delta L_4$ ∴ after multiplying both sides of the equation by 4

$$D_3^2 = D_3^2 - D_4^2 + D_6^2 - D_5^2$$

but $D_5 = D_3 + 2t$ ∴

$$D_3^2 = D_3^2 - D_4^2 + D_6^2 - (D_3 + 2t)^2$$
$$D_6^2 = (D_3 + 2t)^2 + D_4^2$$
$$D_6 = \sqrt{(D_3 + 2t)^2 + D_4^2} \qquad \text{(Equation 4)}$$

Obviously, because $D_5 = D_3 + 2t$ Equation 4 can be rewritten as $D_6 = \sqrt{D_4^2 + D_5^2}$. Both forms show that the thickness $t$ of the wall of chamber 51 is significant in this embodiment.

Although this invention has been described with respect to particular embodiments thereof, it is not to be so limited, as changes and modifications may be made therein which are within the spirit and scope of the invention as defined by the appended claims.

We claim:
1. A hydraulic device comprising: a casing and shaft means; said shaft means being positioned in said casing; means attached to said shaft means for separating said casing into a first, a second, and a third sealed, chambers, and a fourth chamber open to the atmosphere; first fluid communication means connecting said first and second chambers; and second fluid communication means connecting said second and third chambers; the cross-sectional area of said first chamber being related to the effective cross-sectional areas of said second and third chambers such that a change of volume of said first chamber equals the total change of volume of said second and third chambers.

2. The device of claim 1 wherein said cross-sectional relationship is $D_1 = \sqrt{2D_2}$ where $D_1$ = diameter of said first chamber
$D_2$ = diameter of said shaft.

3. The device of claim 1 wherein said cross-sectional relationship is $D_3 = \sqrt{(D_1 + 2t)^2 + D_2^2}$ where $D_1$ = diameter of said first chamber
$D_2$ = diameter of said shaft
$D_3$ = diameter of said third chamber
$t$ = thickness of said casing.

4. The device of claim 1 wherein said means for separating is a plurality of pistons.
5. The device of claim 4 wherein said first communication means is a valve located in one of said pistons.
6. The device of claim 2 wherein said means for separating is a plurality of pistons.
7. The device of claim 3 wherein said means for separating is a plurality of pistons.
8. The device of claim 2 wherein said first communication means is a valve located in one of said pistons.
9. The device of claim 3 wherein said first communication means is a valve located in one of said pistons.
10. A hydraulic shaft positioning device comprising: a first hollow cylinder, a second hollow cylinder arranged parallel to said first cylinder, a first shaft concentric within said first cylinder, a second shaft concentric within said second cylinder, first means on said first shaft for dividing said first cylinder into a first chamber and a second chamber, second means on said second shaft for dividing said second cylinder into third and fourth chambers, said first, second and third chambers being sealed and said fourth chamber having an opening to the atmosphere adjustable communication means in said first shaft for connecting said first and second chambers, and communication means for connecting said second and third chambers, the cross-sectional dimensions of said first chamber being related to the effective cross-sectional dimensions of said second and third chambers such that a change of volume of said first chamber equals the combined change of volume of said second and third chambers.

11. The device of claim 10 wherein the diameter of said first and second cylinders are equal and the diameters of said first and second shafts are equal.

12. The device of claim 11 wherein the cylinder diameter is equal to $\sqrt{2}$ times the shaft diameter.

13. A hydraulic shaft positioning device comprising: a first hollow cylinder, a second hollow cylinder concentric within said first cylinder, a shaft concentric within said second cylinder, means on one end of said shaft and said second cylinder to form a first, second, third and fourth chamber, said first, second and third chambers being sealed and said fourth chamber being open to the atmosphere adjustable communication means in said shaft connecting said first and second chambers, and communication means connecting said second and third chambers, said first and second cylinders and said shaft being dimensioned such that the change of volume of said first chamber equals the combined change of volume of said second and third chambers.

14. The device of claim 13 wherein the dimensional relationship is $D_3 = \sqrt{(D_1+2t)^2 + D_2^2}$ where $D_1$ = diameter of said second cylinder
$D_2$ = diameter of said shaft
$D_3$ = diameter of said first cylinder
$t$ = thickness of said second cylinder.

References Cited by the Examiner

UNITED STATES PATENTS

| 1,025,516 | 5/1912 | Davis | 92—9 X |
| 2,891,765 | 6/1959 | Pearne | 254—89 X |
| 3,236,515 | 2/1966 | Ackerman | 188—96 X |

FOREIGN PATENTS 974,312 11/1964 Great Britain.

MILTON BUCHLER, *Primary Examiner.*

FERGUS S. MIDDLETON, G. E. A. HALVOSA,
*Examiners.*